(12) United States Patent
Sugita et al.

(10) Patent No.: US 6,784,236 B2
(45) Date of Patent: Aug. 31, 2004

(54) ELECTRODEPOSITION COATING COMPOSITION

(75) Inventors: Masaru Sugita, Hiratsuka (JP); Fumiaki Nakao, Toyota (JP); Katsuhisa Sugisaki, Hiratsuka (JP); Kouji Hirano, Yokohama (JP); Kenji Aoki, Hiratsuka (JP); Yoshitaka Mizoguchi, Hiratsuka (JP); Akira Tominaga, Chigasaki (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 249 days.

(21) Appl. No.: 09/840,088

(22) Filed: Apr. 24, 2001

(65) Prior Publication Data

US 2002/0098375 A1 Jul. 25, 2002

(30) Foreign Application Priority Data

Apr. 24, 2000 (JP) ........................................ 2000-122439
Sep. 12, 2000 (JP) ........................................ 2000-276589
Sep. 12, 2000 (JP) ........................................ 2000-276682

(51) Int. Cl.$^7$ ..................... C08K 5/06; C08L 33/02; C08L 33/24; C08L 67/02; C08F 8/30
(52) U.S. Cl. ................. 524/378; 524/604; 524/832; 524/901; 523/426; 525/374
(58) Field of Search ................. 524/378, 604, 524/832, 901; 523/426; 525/374

(56) References Cited

U.S. PATENT DOCUMENTS 3,399,158 A 8/1968 Huitson
5,422,392 A * 6/1995 Floyd et al.
5,959,013 A * 9/1999 Conradi et al.
6,031,028 A * 2/2000 Iino et al.
6,146,512 A * 11/2000 Hoefer et al. ............... 204/502

FOREIGN PATENT DOCUMENTS

| EP | 0 012 463 | | 6/1980 |
| EP | 0 443 605 | | 8/1991 |
| EP | 0 461 566 | | 12/1991 |
| GB | 1076319 | * | 7/1967 |
| WO | 93/11284 | | 6/1993 |
| WO | 97/46628 | | 12/1997 |

* cited by examiner

*Primary Examiner*—Tae H. Yoon
(74) *Attorney, Agent, or Firm*—Wenderoth, Lind & Ponack, L.L.P.

(57) ABSTRACT

The present invention provides an electrodeposition coating composition which has an excellent film forming property and which is excellent in performances such as a smoothness and an anti-corrosion performances even after storing over a long period of time. The electrodeposition coating composition comprises an ester compound selected from the group consisting of:

(a) a diester compound of polyoxyalkylene glycol and aliphatic monocarboxylic acid,
(b) a diester compound of polyoxyalkylene alkyl ether monoalcohol and aliphatic dicarboxylic acid and
(c) a polyester compound obtained by reaction of aliphatic glycol having 2 or 3 carbon atoms, aliphatic dicarboxylic acid and aliphatic monoalcohol.

15 Claims, No Drawings

ELECTRODEPOSITION COATING COMPOSITION

The present invention relates to an electrodeposition coating composition which has an excellent film forming property and which is excellent in performances such as a smoothness and a rust preventive property even after storing over a long period of time.

Cationic type or anionic type electrodeposition coating composition scarcely contain organic solvents, and therefore they are suited to environmental countermeasure such as public pollution prevention and excellent in a throwing property. In particular, a cationic type electrodeposition coating composition forms a coating film which is excellent in a durability and a corrosion resistance and therefore is widely employed as an under coating composition for conductive metallic materials for car bodies.

In order to maintain a film-forming property of the coating film, an electrodeposition coating composition is usually blended with a low boiling organic solvent having a boiling point of about 120° C. or lower (for example, methyl isobutyl ketone (116° C.) and methyl ethyl ketone (80° C.)), a hydrophilic solvent having a boiling point of 120 to 200° C. (for example, butyl cellosolve (171° C.) and propylene glycol monomethyl ether (121° C.)), or a low molecular weight soft resin having a molecular weight of 4000 or less (for example, a xylene resin and polypropylene glycol). However, an electrodeposition coating composition containing such substances is slowly reduced in a film-forming property thereof (film-forming ability) if stored for long time, and it becomes difficult to coat the coating composition in a prescribed film thickness. In addition thereto, there involved is the defect that the coated surface thereof is gradually reduced in a smoothness. Further, blending of a low boiling organic solvent or a hydrophilic solvent goes against a reduction in VOC (a reduction in a content of a volatile organic compound) and therefore is not preferred.

On the other hand, a content of volatile components such as an organic solvent contained in an electrodeposition coating composition is removed to, for example, 1% by weight or less by distillation under reduced pressure in order to lower VOC, but this reduces the film-forming property and makes it difficult to coat the coating composition in a film thickness of 15 μm or more as a cured coating film. In addition thereto, the coating film is likely to be reduced in a smoothness and a corrosion resistance. If an electrodeposition coating composition is applied to alloy-plated steel plates (steel plates covered with an alloy plating of zinc and iron) which are used in many cases as base materials for an automobile outside plate and an applied voltage is elevated in order to coat it in a large film thickness, brought about is the problem that gas is produced to cause pin holes (usually called crater) to reduce a smoothness on the coating film.

A principal object of the present invention is to provide an electrodeposition coating composition, particularly a cationically electrodeposition coating composition which is reduced in a content of a volatile organic solvent and has a good film-forming property and which can readily be coated in a film thickness of 15 μm or more and makes it possible to coat in a large film thickness without bringing about crater even when electrodeposition coated on an alloy-plated steel plate.

Intensive researches repeated by the present inventors have resulted in finding that the object described above can be achieved by adding a specific ester compound to an electrodeposition coating composition, and they have come to complete the present invention.

Thus, the present invention provides an electrodeposition coating composition comprising an ester compound selected from the group consisting of:
(a) a diester compound of polyoxyalkylene glycol and aliphatic monocarboxylic acid,
(b) a diester compound of polyoxyalkylene alkyl ether monoalcohol and aliphatic dicarboxylic acid and
(c) a polyester compound obtained by reaction of aliphatic glycol having 2 or 3 carbon atoms, aliphatic dicarboxylic acid and aliphatic monoalcohol.

The electrodeposition coating composition of the present invention (hereinafter referred to merely as the present coating composition) shall be explained below in further details.

Diester Compounds

Diester Compound (a):

The diester compound (a) capable of being used in the present coating composition is a compound prepared by subjecting two terminal hydroxyl groups contained in polyoxyalkylene glycol (a-1) to esterification reaction with aliphatic monocarboxylic acid (a-2). An alkylene part in the polyoxyalkylene glycol (a-1) constituting the diester compound (a) includes, for example, linear or branched alkylene groups having 2 to 4 carbon atoms such as ethylene, propylene and butylene, and the polyoxyalkylene glycol (a-1) includes, to be specific, polyethylene glycol, polypropylene glycol and polybutylene glycol. These polyoxyalkylene glycols (a-1) have preferably a weight average molecular weight falling in a range of usually 150 to 1000, particularly 200 to 600. The aliphatic monocarboxylic acid (a-2) reacted with the polyoxyalkylene glycol (a-1) has most preferably 6 to carbon atoms, particularly 8 carbon atoms from operational and economical points of view and includes, to be specific, hexanoic acid, heptanoic acid, caprylic acid, nonanoic acid, decanoic acid, 2-ethylhexenoic acid, isooctylic acid and neodecanoic acid.

Diesterification reaction of these polyoxyalkylene glycols (a-1) with the aliphatic monocarboxylic acids (a-2) can be carried out by conventionally known methods. In this case, the glycols and the aliphatic carboxylic acids can be used alone or in combination of two or more kinds thereof respectively. The diester compounds thus obtained have preferably a weight average molecular weight falling in a range of usually 400 to 1200, particularly 450 to 1000.

Diester Compound (b):

The diester compound (b) capable of being used in the present coating composition is a diester compound of polyoxyalkylene alkyl ether monoalcohol (b-1) with aliphatic dicarboxylic acid (b-2). The polyoxyalkylene alkyl ether monoalcohol (b-1) used in this case can be obtained by, for example, a method in which alkylene oxide having 2 to 4 carbon atoms and monohydric alkylalcohol having 4 to 8 carbon atoms are subjected to etherification reaction in an equimolar ratio or one of hydroxyl groups at both ends contained in a polyether compound of alkylene oxide having 2 to 4 carbon atoms is subjected to etherification reaction with monohydric alkylalcohol having 4 to 8 carbon atoms. It has one hydroxyl group and at least one ether bond in a molecule.

The alkylene oxide having 2 to 4 carbon atoms described above includes, for example, ethylene oxide, propylene oxide and butylene oxide, and the monohydric alkylalcohol having 4 to 8 carbon atoms described above includes, for example, butyl alcohol, isobutyl alcohol, pentyl alcohol, isopentyl alcohol, hexyl alcohol, isohexyl alcohol, heptyl alcohol, isoheptyl alcohol, octyl alcohol, isooctyl alcohol and 2-ethylhexyl alcohol.

The etherification reaction of the alkylene oxide with the alkylalcohol described above, the polyetherification reaction of the alkylene oxide and the etherification reaction of hydroxyl groups contained in this polyether compound with the alkylalcohol can be carried out by conventionally known methods. The polyoxyalkylene alkyl ether monoalcohol (b-1) thus obtained has preferably a weight average molecular weight failing in a range of usually 100 to 500, particularly 150 to 400.

Capable of being used as the aliphatic dicarboxylic acid (b-2) reacted with this monoalcohol (b-1) is a compound which has two carboxyl groups in a molecule and in which a part excluding those of the carboxyl group has 2 to 6 carbon atoms, and it includes, for example, succinic acid, glutaric acid, adipic acid, pimelic acid and suberic acid. Among them, adipic acid is particularly preferred from economical and operational points of view.

The diesterification reaction of the monoalcohol (b-1) with the aliphatic dicarboxylic acid (b-2) can be carried out by conventionally known methods. In this case, the monoalcohol (b-1) and the aliphatic dicarboxylic acid (b-2) can be used alone or in combination of two or more kinds thereof respectively. The diester compound (b) thus obtained has suitably a weight average molecular weight failing in a range of usually 300 to 1200, particularly 400 to 1000.

Polyester Compound (c):

The polyester compound (c) which can be used in the present coating composition is obtained by reacting aliphatic glycol (c-1) having 2 or 3 carbon atoms, aliphatic dicarboxylic acid (c-2) and aliphatic monoalcohol (c-3). The aliphatic glycol (c-1) having 2 or 3 carbon atoms used in this case includes, for example, ethylene glycol propylene glycol and 1,3-propanediol, and they can be used alone or in combination of two or more kinds thereof respectively. Capable of being used as the aliphatic dicarboxylic acid (c-2) is a compound which has two carboxyl groups in a molecule and in which a part excluding those of the carboxyl group has 2 to 6 carbon atoms, and it includes, for example, succinic acid, glutaric acid, adipic acid, pimelic acid and suberic acid. They can be used alone or in combination of two or more kinds thereof respectively. Among them, adipic acid is particularly preferred from economical and operational points of view. Further, monoalcohols having 4 to 13, particularly 6 to 10 carbon atoms are suited as the aliphatic monoalcohol (c-3) and include, for example, butyl alcohol, hexyl alcohol, octyl alcohol, 2-ethylhexyl alcohol, isononyl alcohol tridecanol and tridecyl alcohol, and they can be used alone or in combination of two or more kinds thereof respectively. Among them, 2-ethylhexyl alcohol, isononyl alcohol and tridecyl alcohol are particularly suited.

The polyester compound (c) which can be used in the present coating composition is obtained by subjecting the aliphatic glycol (c-1) having 2 or 3 carbon atoms, the aliphatic dicarboxylic acid (c-2) and the aliphatic monoalcohol (c-3) to esterification reaction according to conventionally known methods. The polyester compound (c) thus obtained has preferably a number average molecular weight falling in a range of usually 300 to 2000, particularly 500 to 1500.

Electrodeposition Coating Composition:

The electrodeposition coating composition comprising the ester compound described above includes publicly known cationically electrodeposition coating composition and anionically electrodeposition coating composition.

The cationically electrodeposition coating composition include aqueous dispersions or aqueous solutions each comprising a cationic resin having together a cross-linking functional group such as a hydroxyl group and a cationic group and a cross-linking agent as principal components.

Resins constituting a principal skeleton of the cationic resin include, for example, an epoxy resin, an acryl resin, polybutadiene, an alkyd resin and a polyester resin. Among them, the cationic resins in which an epoxy resin is used and which are prepared by adding amine to the epoxy resin are preferred since they are excellent in a corrosion resistance.

The cationic resin prepared by adding amine to an epoxy resin includes, for example, adducts of epoxy compounds to primary mono- or polyamines, secondary mono- or polyamines and primary and secondary mixed amines (refer to, for example, U.S. Pat. No. 3,984,299); adducts of epoxy compounds to secondary mono- or poly-amines having a primary amino group which is reduced to ketimine (refer to, for example, U.S. Pat. No. 4,017,438); etherification reaction products of epoxy compounds with hydroxyl compounds having a primary amino group which is reduced to ketimine (refer to, for example, Japanese Patent Application Laid-Open No. 43013/1984).

The epoxy compounds described above are compounds each having at least two epoxy groups in a molecule and have suitably a number average molecular weight falling in a range of usually 400 to 4000, particularly 800 to 2000 and an epoxy equivalent falling in a range of usually 190 to 2000, particularly 400 to 1000. Such epoxy compounds can be obtained by, for example, reacting polyphenol compounds with epichlorohydrin, and the polyphenol compounds include, for example, bis(4-hydroxyphenyl)-2,2-propane, 4,4-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4-dihydroxydiphenylsulfone, phenol novolak and cresol novolak.

On the other hand, the cross-linking agent used in combination with the cationic resin includes, for example, blocked polyisocyanate compounds and amino resins. The blocked polyisocyanate compounds are preferably compounds in which substantially all isocyanate groups contained in the polyisocyanate compounds are blocked by addition reaction with blocking agents. In this case, the polyisocyanate compound is a compound having at least two isocyanate groups in a molecule and includes conventionally known aromatic, alicyclic and aliphatic polyisocyanate compounds and pre-polymers having terminal isocyanate groups which are obtained by reacting excess amounts of these polyisocyanate compounds with low molecular weight active hydrogen-containing compounds such as glycols and triols. Capable of being used as the blocking agent are, for example, conventionally known lactam base, oxime base, phenol base, aliphatic alcohol base, aromatic alkylalcohol base and ether alcohol base compounds.

A use proportion of the cationic resin to the cross-linking agent falls suitably in a range of 50 to 90%, particularly 65 to 80% in the cationic resin and 50 to 10%, particularly 35 to 20% in the cross-linking agent based on the total solid matter weight of both components. The cationic resin can be made water-soluble or water-dispersible by neutralizing with a water-soluble organic acid such as formic acid, acetic acid and lactic acid.

A method for blending the ester compound described above with the cationically electrodeposition coating composition shall not specifically be restricted and can be carried out by, for example, mixing it in advance with the cationic resin and the cross-linking agent, mixing it in emulsion-blending the cationic resin and the cross-linking agent and mixing it in dispersing a pigment. The ester compounds described above can be used alone or in combination of two or more kinds thereof, and a blending amount thereof falls suitably in a range of usually 0.5 to 20 parts by weight, particularly 1 to 10 parts by weight per 100 parts by weight of the resin solid matter of the cationically electrodeposition coating composition.

Further, capable of being suitably added, if necessary, to the cationically electrodeposition coating composition are a color pigment, a rust preventive pigment, an extender pigment, an organic solvent, a cissing preventive, a surfactant, a catalyst, an inhibitor, a rheology controlling agent and a pigment dispersant.

Among them, capable of being used as the rust preventive pigment are, for example, zinc powder, zinc phosphate, calcium phosphate, aluminum phosphate, aluminum polyphosphate such as aluminum tripolyphosphate, aluminum orthophosphate, calcium orthophosphate, boric acid base rust preventive pigments, alkaline earth metals, zinc oxide, or complex oxide of at least one selected from them with iron oxide, tangstic acid base rust preventive pigments, phosphorous acid base rust preventive pigments, hypophosphorous acid base rust preventive pigments, nitrous acid base rust preventive pigments, vanadic acid base rust preventive pigments, zinc formate, zinc acetate and zinc octenate. Further, capable of being used as the rust preventive pigment are compounds such as $Zr(OH)_4$, $Mg_4Al_2(OH)_{12}CO_3 \cdot 3H_2O$, $Mg_6Al_2(OH)_{16}CO_3 \cdot 5H_2O$ and $Mg_6Al_7(OH)_{16}CO_3 \cdot 4H_2O$, and bismuth-containing compounds such as bismuth lactate, bismuth silicate, triphenyl bismuth, bismuth gallate, bismuth hydroxide, bismuth trioxide, bismuth nitrate, bismuth bexzate, bismuth citrate and bismuth oxycarbonate.

The cationically electrodeposition coating composition of the present invention containing the ester compound described above is controlled to a solid matter content of 5 to 40% by weight, preferably 10 to 25% by weight by adding deionized water and to a pH of 5.5 to 9, preferably 5.5 to 7 to prepare an electrodeposition bath, and an article for coating is immersed therein as a cathode at a bath temperature of 15 to 35° C. on a condition of a loaded voltage of 100 to 400 V, followed by applying an electric current, whereby cationically electrodeposition coating can be carried out. After applying an electric current, the coated article is pulled up from the electrodeposition bath and washed with water, and then it is heated at about 100 to about 200° C., preferably about 140 to about 180° C. for 10 to 40 minutes, whereby the coating film can be cured. A film thickness thereof is preferably 5 to 100 $\mu$m, particularly 15 to 40 $\mu$m in terms of a cured coating film thickness. The cationically electrodeposition coating composition of the present invention containing the ester compound described above does not cause crater when coated on an alloy-plated steel plate and can readily provide a film thickness of 15 $\mu$m or more based on a cured coating film.

On the other hand, capable of being used as the anionically electrodeposition coating composition to which the ester compound described above can be added according to the present invention containing is, for example, a conventionally known anionically electrodeposition coating composition comprising an aqueous dispersion or an aqueous solution comprising an anionic resin having a neutralized carboxyl group and a cross-linking agent as principal components.

Conventionally known resins which are blended with conventional anionically electrodeposition coating composition can be used as the above anionic resin, and use of anionic acryl resins having a carboxyl group and a hydroxyl group provides electrodeposition coating composition which form coating films having excellent weatherability and smoothness, and therefore it is suited. Polyester resins, polyurethane resins and vinyl resins each having a carboxyl group and a hydroxyl group can also be used as the anionic resin.

The anionic resin can be made water-soluble or water-dispersible by neutralizing a carboxyl group thereof with a neutralizing agent including organic amines such as ammonia, diethylamine, ethylethanolamine, diethanolamine, monoethanolamine, monopropanolamine, isopropanolamine, ethylaminoethylamine, hydroxyethylamine and diethylenetriamine and alkaline metal hydroxides such as sodium hydroxide and potassium hydroxide.

These anionic resins have preferably an acid value falling in a range of usually about 10 to about 200 mg KOH/g, particularly about 20 to about 100 mg KOH/g and a hydroxyl group value falling in a range of about 30 to about 300 mg KOH/g, particularly about 40 to about 200 mg KOH/g. Further, the anionic resins have preferably a number average molecular weight falling in a range of usually 10000 or less, particularly 4000 to 8000.

The cross-linking agent used in combination with the anionic resin includes, for example, melamine resins, blocked polyisocyanate compounds and polyoxazoline compounds, and among them, the melamine resins are particularly preferred.

Capable of being used as the melamine resin are etherified melamine resins in which a part or all of methylol groups of methylolmelamine obtained by reacting melamine with formaldehyde is modified with at least one monohydric alcohol having 1 to 10 carbon atoms. Such melamine resins are preferably those in which mononuclide to polynuclide (about 2 to about 5) account for 50% by weight or more, and those having an imino group, a methylol group and other functional groups may be contained in the melamine resins.

The blocked polyisocyanate compound is obtained by blocking an isocyanate group of a polyisocyanate compound, and to be specific, the compounds given as the examples in the cationically electrodeposition coating composition described above can suitably be used. The blocking agents are dissociated from these compounds by heating to reproduce free isocyanate groups, and the isocyanate groups are subjected to cross-linking reaction with active hydrogens of hydroxyl groups contained in the anionic resin.

A use proportion of the anionic resin to the cross-linking agent falls suitably in a range of 50 to 90%, particularly 60 to 80% in the cationic resin and 50 to 10%, particularly 40 to 20% in the cross-linking agent based on the total solid matter weight of both components.

Further, capable of being used as the anionically electrodeposition coating composition are coating compositions containing anionic resins which are cross-linked and cured by irradiation with an active energy ray such as a UV ray and anionic resins which are cross-linked and cured by irradiation with a UV ray and heating.

A method for blending the ester compound described above into the anionically electrodeposition coating composition shall not specifically be restricted and can be carried out by, for example, mixing it in advance with the anionic resin and the cross-linking agent, mixing it in emulsion-blending the anionic resin and the cross-linking agent and mixing it in dispersing a pigment. The ester compounds described above can be used alone or in combination of two or more kinds thereof, and a blending amount thereof falls suitably in a range of usually 0.5 to 20 parts by weight, particularly 1 to 10 parts by weight per 100 parts by weight of the resin solid matter of the anionically electrodeposition coating composition.

Further, capable of being suitably added, if necessary, to the anionically electrodeposition coating composition are a color pigment, such rust preventive pigment as given as the example in the cationically electrodeposition coating composition described above, an extender pigment, an organic solvent, an acid for neutralizing, a cissing preventive, a surfactant, a catalyst, an inhibitor, a rheology controlling agent and a pigment dispersant.

The anionically electrodeposition coating composition of the present invention containing the ester compound described above is controlled to a bath solid matter content of 3 to 40% by weight, preferably 5 to 25% by weight by adding deionized water and further to a pH of 6 to 9, preferably 6.5 to 8 and a bath temperature of 15 to 40° C., preferably 15 to 30° C. to prepare an electrodeposition bath, and an article for coating is immersed therein as an anode to apply a direct current having a fixed voltage of 1 to 400 V or apply a fixed voltage or current of 1 to 400 mA, whereby anionically electrodeposition coating can be carried out. In this case, prescribed voltage or current may be applied from starting applying an electric current or the voltage or current may gradually be elevated up to prescribed voltage or current in 1 to 30 seconds. Further, the current-applying time is suitably 30 seconds to 5 minutes, and the resulting film thickness is preferably 5 to 100 $\mu$m, particularly 15 to 40 $\mu$m in terms of a cured coating film thickness.

After electrodeposition coating, the coated article is pulled up from the electrodeposition bath and washed with water, and then the coating film can be cured by heating or irradiating with active energy or by both heating and irradiating. Curing can be carried out by heating at about 100 to about 200° C., preferably about 120 to about 180° C. for 10 to 60 minutes. On the other hand, the active energy ray includes, for example, a UV ray, a laser beam, an X-ray, an electron beam and an ion beam ray.

In order to reduce a content of the volatile organic solvent in coating the present coating composition, the organic solvent (for example, an organic solvent having a boiling point of 130° C. or lower) is preferably removed in advance by removal under reduced pressure. In order to easily carry out the removal under reduced pressure, a volatile organic solvent having a boiling point of 130° C. or lower is preferably used. The organic solvent having such boiling point includes, for example, methyl ethyl ketone, methyl isobutyl ketone and isopropanol. The removal under reduced pressure is preferably carried out at a pressure of lower than −700 mm Hg.

The present coating composition containing the ester compound described above can form a coating film which is excellent in a throwing property (electrodeposition coating) and a film-forming property and which is improved in a corrosion resistance and a smoothness even if the volatile organic solvent has a content of 1% by weight or less, preferably 0.5% by weight or less. In particular, it becomes possible to coat the coating composition in a film thickness of 15 $\mu$m or more, particularly 20 $\mu$m or more in terms of a cured coating film thickness even when the cationically electrodeposition coating composition is coated on an alloy-plated steel plate, and crater is not observed to be produced. These characteristics are not varied even after storing the present coating composition over a long period of time. Thus, according to the present invention, a content of the volatile organic solvent can be reduced to 1% by weight or less without lowering a corrosion resistance and a smoothness of the coating film, and a reduction in VOC can be achieved.

The cationically electrodeposition coating composition and the anionically electrodeposition coating composition of the present invention are preferably used as an under coating composition.

The electrodeposition coating composition of the present invention containing the ester compound described above can be reduced in a content of the volatile organic solvent to a half or lower as compared with in the past without deteriorating the coating film performance even after stored over an extended period of time. For example, the content can be reduced to 1% by weight or less in the cationically electrodeposition coating composition, and it can be reduced to 3% by weight or less in the anionically electrodeposition coating composition. Further, the coating film which is excellent in a film-forming property and has a good smoothness can be formed without lowering the throwing property and the corrosion resistance even when coated on ordinary coating conditions. In particular, it is possible to coat the coating composition in a film thickness of 16 $\mu$m or more, particularly 17 to 50 $\mu$m in terms of a cured coating film thickness without bringing about crater when coated on an alloy-plated steel plate. Thus, according to the present invention, the electrodeposition coating composition in which a content of the volatile organic solvent is 1% by weight or less can be provided without lowering a corrosion resistance and a smoothness of the coating film formed, and a reduction in VOC can be achieved.

The present invention shall more specifically be explained below with reference to examples and comparative examples, but the present invention shall not be restricted only to them. Parts and percentage are based on weight in principle, and a film thickness of the coating film is based on a cured coating film.

1. SAMPLE

1) Electrodeposition Coating Composition:

a): Dissolved in 1012 parts of methyl isobutyl ketone was 1900 parts of "Epon 1004" (trade name, manufactured by Yuka Shell 10 Co., Ltd., bisphenol A type epoxy resin, epoxy equivalent: about 950), and the solution was heated to 80 to 100° C. Then, 124 parts of diethylamine was dropwise added, and the solution was maintained at 110° C. for 2 hours to obtain an amine-added epoxy resin having an amine value of 47. On the other hand, 1000 parts of a dimer acid type polyamide resin having an amine value of 100 ("Varsamide 460", trade name, manufactured by Cognis Japan Co., Ltd.) was dissolved in 429 parts of methyl isobutyl ketone, and the solution was refluxed by heating at 130 to 150° C. to distil off produced water to obtain the amide resin having a terminal amino group which was changed to ketimine. It was maintained at 150° C. for about 3 hours, and after distillation of water stopped, it was cooled down to 60° C. Then, this was added to the amine-added epoxy resin described above, and the mixture was heated to 100° C. and maintained for one hour, followed by cooling it down to a room temperature to obtain a vanish of an amine-added epoxy resin-polyamide-modified resin having a solid content of 68% and an amine value of 65 for a cationically electrodeposition coating composition.

b): "Elecron #7200" (manufactured by Kansai Paint Co., Ltd., an anionically electrodeposition coating composition prepared by adding 100 parts (solid matter) of an unsaturated resin obtained by reacting a polybutadiene/epoxy resin fatty acid ester/linseed oil mixture with maleic acid and having an acid value of about 80 mg KOH/g) and 72.5 parts of a pigment paste (remark 1) and then adding deionized water; a solid content: 13%, pH: 8.1).

(Remark 1) pigment paste: a paste prepared by adding 5 parts (solid matter) of an unsaturated resin, 10 parts of a conductive agent ("Vulcan XC72", manufactured by Cabot Co., Ltd.), 3 parts of bismuth hydroxide, 3 parts of dioctyltin oxide and 35 parts of water and mixing and dispersing them.

2. EXAMPLES AND COMPARATIVE EXAMPLES

Examples 1 to 5, 7 to 10 and 12 to 16 and Comparative Examples 1 to 4, 6 to 9 and 11 to 13

Homogeneously mixed were 103 parts (70 parts in terms of a resin solid matter) of the vanish for a cationically electrodeposition coating composition, 30 parts of a 2-ethylhexyl alcohol-blocked product of tolylenediisocyanate, an ester compound (a composition and a blending amount are shown in Table 1, Table 2 and Table 3) and 15 parts of a 10% acetic acid aqueous solution, and then 150 parts of deionized water was dropwise added in about 15 minutes while strongly stirring to obtain an emulsion having a solid matter content of 34% for a cationically electrodeposition coating composition. Subsequently, this emulsion was subjected to "desolvent" under reduced pressure at 30 to 40° C. so that a content of the volatile organic solvent contained in the finished cationically electrodeposition coating composition became 0.5% or less. Thereafter, 71 parts of a pigment paste (remark 2) was added while stirring to 300 parts of the emulsion obtained by adding deionized water of the same amount as the total amount of the organic solvent and water which were removed by the desolvent described above, and it was further diluted with deionized water to obtain a cationically electrodeposition coating composition having a solid content of 20%.

(Remark 2) pigment paste: a dispersion comprising 5 parts of a vanish for a cationically electrodeposition coating composition, 2.6 parts of a 10% acetic acid aqueous solution, 17 parts of titanium oxide, 2 parts of bismuth hydroxide, 8 parts of refined clay, 0.3 part of carbon black and 36.5 parts of de-ionized water; solid content: 43%.

Example 6

Blended was 2 parts of dioctoate (average molecular weight: 452) of polyethylene glycol (average molecular weight: 200) per 100 parts of a resin solid matter of the anionically electrodeposition coating composition to obtain an anionically electrodeposition coating composition (refer to Table 1).

Comparative Example 5

Prepared was an anionically electrodeposition coating composition before blending the same polyethylene glycol dioctoate as used in Example 6 (refer to Table 1).

Example 11

Blended was 2 parts of di(butoxyethoxyethyl) adipate (weight average molecular weight: 434) per 100 parts of a resin solid matter of the anionically electrodeposition coating composition to obtain an anionically electrodeposition coating composition (refer to Table 2).

Comparative Example 10

Prepared was an anionically electrodeposition coating composition before blending the same di(butoxyethoxyethyl) adipate as used in Example 11 (refer to Table 2).

Example 16

Blended was 2 parts of a polyester compound which was prepared by reacting adipic acid/ethylene glycol/isononyl alcohol which had a number average molecular weight of 700, 2 glycol carbon atoms and 9 monoalcohol carbon atoms per 100 parts of a resin solid matter of the anionically electrodeposition coating composition to obtain an anionically electrodeposition coating composition (refer to Table 3).

Comparative Example 14

Prepared was an anionically electrodeposition coating composition before blending the same polyester compound as used in Example 16 (refer to Table 3).

3. PERFORMANCE TEST RESULTS

The compositions and the performance test results of the electrodeposition coating composition obtained in the examples and the comparative examples described above are shown in Table 1 to Table 3. The tests for the performances shown in Table 1 to Table 3 were carried out by the following methods.

Volatile Organic Solvent Content:

A content (%) of the volatile organic solvent in the cationically electrodeposition coating composition having a solid content of 20% was determined by means of gas chromatography. In this case, the volatile organic solvent is an organic solvent in which non-volatile matter becomes 0% by heating at 105° C. for 3 hours. When heating the ester compounds used in the examples on this condition, the non-volatile matters account for 98% or more.

Throwing Property:

Four steel plates having a size of 70×150×0.8×mm were prepared, and opening parts having a diameter of 8 mm were provided in the central parts of three plates out of them. The three steel plates having the opening parts were arranged at intervals of 20 mm so that they became farther in order from an anode side, and one steel plate having no opening part was disposed in the farthest position, wherein a distance between the frontest steel plate and the anode was set to 110 mm. The side parts and the bottom part of the four steel plates thus arranged were surrounded by insulating plastic sheets to form a box in which an upper part was opened (provided that the metal parts of the outsides of the first and fourth steel plates were exposed). This was immersed in an electrodeposition bath, and the electrodeposition coating composition was allowed to get into the box, wherein an anode side of the steel plate provided with an opening part which was in the closest position looking from the anode side was designated as an A face, and an anode side of the steel plate provided with no opening part which was in the farthest position was designated as a G face. A thicknesses (cured coating film) of the electrodeposition coating film on this G face was measured (BOX method). The larger film thickness shows that the throwing property is better. The electrodeposition conditions were a bath temperature of 28° C., a voltage of 250 V and an electric current-applying time of 180 seconds. In the evaluation criteria, the mark ○ shows that the film thickness is 10 $\mu$m or more on the G face; the mark Δ shows that the film thickness is 5 to 9 $\mu$m on the G face; and the mark X shows that the film thickness is 4 $\mu$m or less on the G face. This test was carried out only for the cationically electrodeposition coating composition.

Film-forming Property:

A steel plate subjected to degreasing was subjected to electrodeposition coating at a bath temperature of 28° C. and an electric current-applying time of 180 seconds and washed with water, and then a film thickness of the coating film cured and formed by heating at 170° C. for 30 minutes was examined. The loaded voltage in coating was 250 V in the case of the cationically electrodeposition coating composition and 150 V in the case of the anionically electrodeposition coating composition.

Crater Property:

An alloy zinc-plated steel plate was coated at a bath temperature of 28° C. and such a loaded voltage that a film thickness of the cured coating film became 17 μm and washed with water, and then the number of resulting pin holes per 100 m² on the coated surface of the coating film cured by heating at 170° C. for 30 minutes was examined. The mark ○ shows that the pin holes are not produced; the mark Δ shows that 5 to 10 pin holes are produced; and the mark X shows that 10 or more pin holes are produced.

Smoothness:

A steel plate subjected to degreasing was coated at a bath temperature of 28° C. and such a loaded voltage that a film thickness of the cured coating film became 17 μm and washed with water, and then the coated surface of the coating film cured by heating at 170° C. for 30 minutes was visually judged. The mark ○ shows that the smoothness is good; the mark Δ shows that the smoothness is a little inferior; and the mark X shows that the smoothness is very inferior.

In Tables 1 to 3, "beginning" means the electrodeposition coating composition immediately after opened and stirred at 30° C. for 3 days after produced, and "after stored" means the electrodeposition coating composition immediately after opened and stirred at 30° C. for 10 days.

TABLE 1

|  | Example | | | | | | Comparative example | | | |
|---|---|---|---|---|---|---|---|---|---|---|
|  | 1 | 2 | 3 | 4 | 5 | 6 | 1 | 2 | 3 | 4 |
| Cationically electrodeposition coating composition | 100 | 100 | 100 | 100 | 100 |  | 100 | 100 | 100 |  |
| Anionically electrodeposition coating composition |  |  |  |  |  | 100 |  |  |  | 100 |
| Diester compounds |  |  |  |  |  |  |  |  |  |  |
| 1) | 2 |  |  |  |  |  | 2 |  |  |  |
| 2) |  | 2 |  |  |  |  |  |  |  |  |
| 3) |  |  | 2 |  |  |  |  |  |  |  |
| 4) |  |  |  | 2 |  |  |  |  |  |  |
| 5) |  |  |  |  | 2 | 2 |  |  |  |  |
| 6) |  |  |  |  |  |  |  | 2 |  |  |
| 7) |  |  |  |  |  |  |  |  | 2 |  |
| 8) |  |  |  |  |  |  |  |  |  | 2 |
| Performance test results |  |  |  |  |  |  |  |  |  |  |
| Organic solvent content (%) | 0.7 | 0.7 | 0.7 | 0.7 | 0.7 | 3.0 | 0.7 | 0.7 | 0.7 | 3 |
| Film-forming property |  |  |  |  |  |  |  |  |  |  |
| Beginning | 18 | 19 | 19 | 19 | 17 | 21 | 12 | 13 | 17 | 13 |
| After stored | 17 | 17 | 17 | 17 | 16 | 20 | 10 | 11 | 11 | 10 |
| Crater property |  |  |  |  |  |  |  |  |  |  |
| Beginning | ○ | ○ | ○ | ○ | ○ | ○ | X | X | ○ | ○ |
| After stored | ○ | ○ | ○ | ○ | ○ | ○ | X | X | X | X |
| Smoothness |  |  |  |  |  |  |  |  |  |  |
| Beginning | ○ | ○ | ○ | ○ | ○ | ○ | Δ | Δ | ○ | Δ |
| After stored | ○ | ○ | ○ | ○ | ○ | ○ | X | X | X | X |
| Throwing property | ○ | ○ | ○ | ○ | ○ | — | Δ | Δ | X | — |

The diester compounds 1) to 8) shown in Table 1 had the following compositions:

1) Dioctoate of polyethylene glycol (average molecular weight: 200), average molecular weight: 452
2) Dioctoate of polyethylene glycol (average molecular weight: 300), average molecular weight: 552
3) Dioctoate of polyethylene glycol (average molecular weight: 400), average molecular weight: 652
4) Dioctoate of polyethylene glycol (average molecular weight: 600), average molecular weight: 852
5) Dioctoate of polypropylene glycol (average molecular weight: 400), average molecular weight: 652
6) Polyethylene glycol (average molecular weight: 400) (for comparison)
7) Diobenzoate of polyethylene glycol (average molecular weight: 200), average molecular weight: 408 (for comparison)

8) Diethylene glycol monobutyl ether (average molecular weight: 162) (for comparison)

TABLE 2

|  | Example |  |  |  |  | Comparative example |  |  |  |  |  |
|---|---|---|---|---|---|---|---|---|---|---|---|
|  | 7 | 8 | 9 | 10 | 11 | 5 | 6 | 7 | 8 | 9 | 10 |
| Cationically electrodeposition coating composition | 100 | 100 | 100 | 100 |  | 100 | 100 | 100 | 100 | 100 |  |
| Anionically electrodeposition coating composition |  |  |  |  | 100 |  |  |  |  |  | 100 |
| Diester compounds |  |  |  |  |  |  |  |  |  |  |  |
| Name | 9) | 10) | 11) | 12) | 9) | 13) | 14) | 15) | 16) | 17) | — |
| Blending amount | 2 | 2 | 2 | 2 | 2 | 2 | 2 | 2 | 2 | 2 | — |
| Performance test results |  |  |  |  |  |  |  |  |  |  |  |
| Organic solvent content (%) | 0.7 | 0.7 | 0.7 | 0.7 | 3.0 | 0.7 | 0.7 | 0.7 | 0.7 | 0.7 | 3 |
| Film-forming property |  |  |  |  |  |  |  |  |  |  |  |
| Beginning | 20 | 19 | 19 | 19 | 22 | 16 | 15 | 15 | 12 | 17 | 13 |
| After stored | 18 | 17 | 18 | 17 | 20 | 11 | 10 | 11 | 10 | 11 | 10 |
| Crater property |  |  |  |  |  |  |  |  |  |  |  |
| Beginning | ○ | ○ | ○ | ○ | ○ | Δ | Δ | Δ | x | ○ | ○ |
| After stored | ○ | ○ | ○ | ○ | ○ | x | x | x | x | x | x |
| Smoothness |  |  |  |  |  |  |  |  |  |  |  |
| Beginning | ○ | ○ | ○ | ○ | ○ | Δ | Δ | Δ | Δ | ○ | Δ |
| After stored | ○ | ○ | ○ | ○ | ○ | x | x | x | x | x | x |
| Throwing property | ○ | ○ | ○ | ○ | — | Δ | Δ | Δ | Δ | x | — |

The diester compounds 9) to 17) shown in Table 2 had the following compositions:

9) Di(butoxyethoxyethyl) adipate (weight average molecular weight: 434)
10) Bis(polyoxyethylene-2-ethylhexyl ether) adipate (weight average molecular weight: 546)
11) Bis(polyoxyethylene-2-ethylhexyl ether) adipate (weight average molecular weight: 722)
12) Bispolyoxyethylene-2-ethylhexyl ether) adipate (weight average molecular weight: 898)
13) 2-Ethylhexyl adipate (weight average molecular weight: 370) (for comparison)
14) 2-Ethylhexyl sebacate (weight average molecular weight: 426) (for comparison)
15) Ethylene glycol dioctylate (weight average molecular weight: 314) (for comparison)
16) Polyethylene glycol (weight average molecular weight: 400) (for comparison)
17) Diethylene glycol monobutyl ether (weight average molecular weight: 162) (for comparison)

TABLE 3

|  | Example |  |  |  |  | Comparative example |  |  |  |
|---|---|---|---|---|---|---|---|---|---|
|  | 12 | 13 | 14 | 15 | 16 | 11 | 12 | 13 | 14 |
| Cationically electrodeposition coating composition | 100 | 100 | 100 | 100 |  | 100 | 100 | 100 |  |
| Anionically electrodeposition coating composition |  |  |  |  | 100 |  |  |  | 100 |
| Diester compounds |  |  |  |  |  |  |  |  |  |
| Name | 18) | 19) | 20) | 21) | 18) | 22) | 23) | 24) | — |
| Blending amount | 2 | 2 | 2 | 2 | 2 | 2 | 2 | 2 | — |
| Performance test results |  |  |  |  |  |  |  |  |  |
| Organic solvent content (%) | 0.7 | 0.7 | 0.7 | 0.7 | 3.0 | 0.7 | 0.7 | 0.7 | 3 |
| Film-forming property |  |  |  |  |  |  |  |  |  |
| Beginning | 20 | 19 | 19 | 19 | 18 | 14 | 14 | 17 | 13 |
| After stored | 18 | 17 | 18 | 17 | 17 | 11 | 10 | 11 | 10 |
| Crater property |  |  |  |  |  |  |  |  |  |
| Beginning | ○ | ○ | ○ | ○ | ○ | Δ | x | ○ | ○ |
| After stored | ○ | ○ | ○ | ○ | ○ | x | x | x | x |
| Smoothness |  |  |  |  |  |  |  |  |  |
| Beginning | ○ | ○ | ○ | ○ | ○ | Δ | Δ | ○ | Δ |
| After stored | ○ | ○ | ○ | ○ | ○ | x | x | x | x |
| Throwing property | ○ | ○ | ○ | ○ | — | Δ | Δ | x | — |

The polyester compounds 18) to 24) shown in table 3 had the following compositions:

18) obtained by reacting adipic acid/ethylene glycol/propylene glycol/isononyl alcohol and having a number average molecular weight of 700, a glycol average carbon number of 2.5 and a monoalcohol carbon number of 9
19) obtained by reacting adipic acid/propylene glycol/2-ethylhexyl alcohol and having a number average molecular weight of 1300, a glycol carbon number of 3 and a monoalcohol carbon number of 8
20) obtained by reacting adipic acid/propylene glycol/isononyl alcohol and having a number average molecular weight of 1000, a glycol carbon number of 3 and a monoalcohol carbon number of 9
21) obtained by reacting adipic acid/propylene glycol/tridecyl alcohol and having a number average molecular weight of 800, a glycol carbon number of 3 and a monoalcohol carbon number of 13
22) obtained by reacting adipic acid/ethylene glycol/propylene glycol and having a number average molecular weight of 1000, a glycol average carbon number of 2.5 and a monoalcohol carbon number of 0 (for comparison)
23) obtained by reacting adipic acid/1,3-butanediol/2-ethylhexyl alcohol and having a number average molecular weight of 1200, a glycol carbon number of 4 and a monoalcohol carbon number of 8 (for comparison)
24) Diethylene glycol monobutyl ether (number average molecular weight: 162) (for comparison)

What is claimed is:

1. An electrodeposition coating composition comprising:
   (i) a cationic or anionic resin and a cross-linking agent, and
   (ii) an ester compound selected from the group consisting of:
      (b) a diester compound of polyoxyalkylenealkyl ether monoalcohol and aliphatic dicarboxylic acid, and
      (c) a polyester compound obtained by reaction of aliphatic glycol having 2 or 3 carbon atoms, aliphatic dicarboxylic acid and aliphatic monoalcohol.

2. The electrodeposition coating composition as described in claim 1, wherein the polyoxyalkylene alkyl ether monoalcohol in the diester compound (b) has an alkylene group having 2 to 4 carbon atoms and an alkyl group having 4 to 8 carbon atoms.

3. The electrodeposition coating composition as described in claim 1, wherein the polyoxyalkylene alkyl ether monoalcohol in the diester compound (b) has a weight average molecular weight falling in a range of 100 to 500.

4. The electrodeposition coating composition as described in claim 1, wherein the aliphatic dicarboxylic acid in the diester compound (b) is aliphatic dicarboxylic acid having 4 to 8 carbon atoms.

5. The electrodeposition coating composition as described in claim 4, wherein the aliphatic dicarboxylic acid is selected from the group consisting of succinic acid, glutaric acid, adipic acid, pimelic acid and suberic acid.

6. The electrodeposition coating composition as described in claim 1, wherein the diester compound (b) has a weight average molecular weight falling in a range of 300 to 1200.

7. The electrodeposition coating composition as described in claim 1, wherein the aliphatic glycol in the polyester compound (c) is selected from the group consisting of ethylene glycol, propylene glycol and 1,3-propanediol.

8. The electrodeposition coating composition as described in claim 1, wherein the aliphatic dicarboxylic acid in the polyester compound (c) is aliphatic dicarboxylic acid having 4 to 8 carbon atoms.

9. The electrodeposition coating composition as described in claim 8, wherein the aliphatic dicarboxylic acid is selected from the group consisting of succinic acid, glutaric acid, adipic acid, pimelic acid and suberic acid.

10. The electrodeposition coating composition as described in claim 1, wherein the aliphatic monoalcohol in the polyester compound (c) is aliphatic monoalcohol having 4 to 13 carbon atoms.

11. The electrodeposition coating composition as described in claim 1, wherein the aliphatic monoalcohol is selected from the group consisting of butyl alcohol, hexyl alcohol, octyl alcohol, 2-ethylhexyl alcohol, isononyl alcohol, tridecanol and tridecyl alcohol.

12. The electrodeposition coating composition as described in claim 1, wherein the polyester compound (c) has a weight average molecular weight falling in a range of 300 to 2000.

13. The electrodeposition coating composition as described in claim 1, comprising the ester compound in a range of 0.5 to 20 parts by weight per 100 parts by weight of resin solid matter of the electrodeposition coating composition.

14. The electrodeposition coating composition as described in claim 1, comprising the ester compound in a range of 1 to 10 parts by weight per 100 parts by weight of resin solid matter of the electrodeposition coating composition.

15. An article coated with the electrodeposition coating composition as described in claim 1.

* * * * *